UNITED STATES PATENT OFFICE.

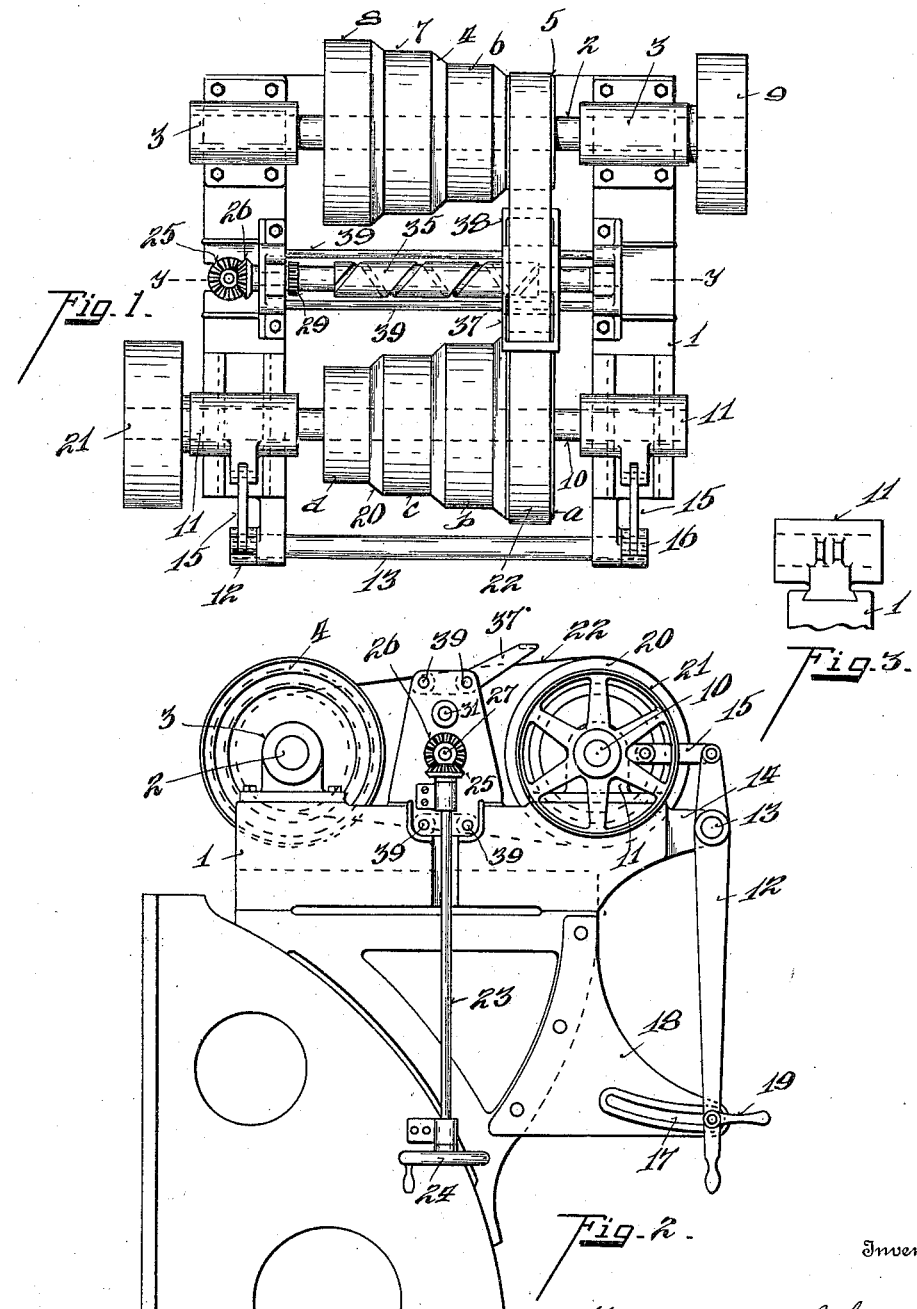

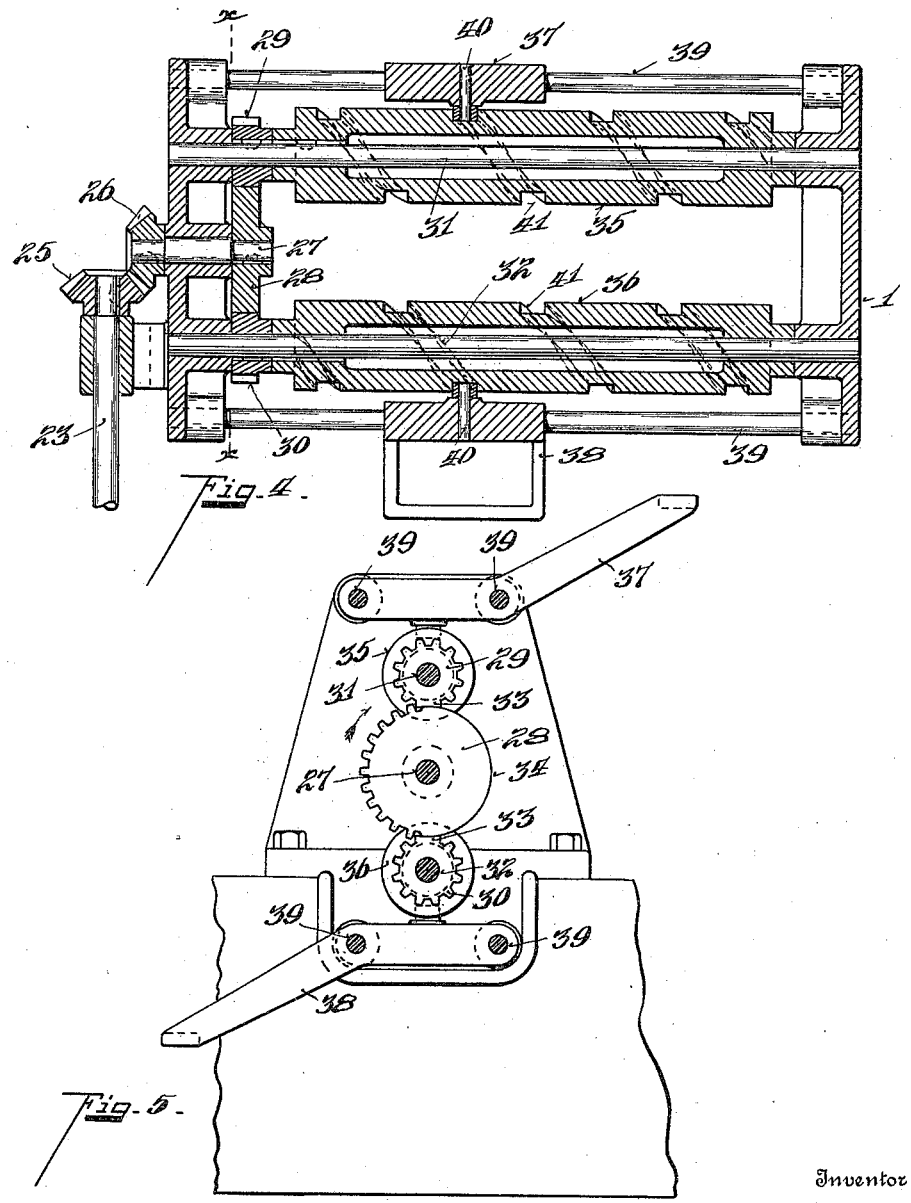

HERMAN W. SCHATZ, OF CINCINNATI, OHIO, ASSIGNOR TO THE AMERICAN TOOL WORKS CO., OF CINCINNATI, OHIO, A CORPORATION.

VARIABLE-SPEED MECHANISM.

983,251.  Specification of Letters Patent.  Patented Jan. 31, 1911.

Application filed September 1, 1909.  Serial No. 515,739.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to an improvement in variable speed devices.

One of the objects of my invention is to provide a variable speed device primarily of the double cone pulley and belt type with means for shifting a portion of the belt in advance of the remainder thereof in effecting a speed change.

Another object of my invention is to provide means for shifting the support of one of the cone or step-pulleys of a variable speed device of the cone pulley and belt type to tighten the belt after a change or shifting of the belt has taken place or to release the belt to effect a change.

Another object of my invention is to provide a variable speed device of the cone pulley and belt type with a pair of belt shifting devices, one adjacent to each pulley, with means for independently shifting each belt shifter and alternately actuating the same for shifting the belt from one pulley step in advance of a relative shifting on the second pulley.

The features of my invention are more fully set forth in the description of the accompanying drawings, forming a part of this specification, in which:—

Figure 1 is a top plan view of my improved variable speed mechanism. Fig. 2 is a side elevation thereof. Fig. 3 is a detailed side view of one of the movable bearings. Fig. 4 is an enlarged section on line $y, y$, Fig. 1. Fig. 5 is a section on line $x, x$, Fig. 4.

I have found that it is more convenient to shift the belt from one step of a pair of pulleys to a second by advancing the movement of that portion of the belt traveling over the larger diameter pulley to the second step of smaller diameter, so as to release the drive between the two pulleys before shifting the belt upon the second pulley from a smaller diameter or given diameter to a larger one, and especially when the pulleys are run at high speed and with wide belts. This enables the making of a quick change from one speed to another, without necessitating the employment of slowing-down devices or the like to reduce the speed to effect the change.

My variable speed device is adapted for all the uses wherein changes of speed are desired.

1 represents the main frame, which, as shown in the drawing, is mounted upon the frame of a planer, but it is obvious that the same is applicable to any of the well-known uses where a change of speed is desired.

2 represents a shaft journaled in bearings 3, fixed upon the frame 1, and 4 represents a step-pulley, and as illustrated, is provided with four steps, 5, 6, 7, and 8, for producing four changes of speed. It is of course obvious that the pulley may be provided with more or less steps, as desired.

9 represents a pulley fixed upon shaft 2, which may be either the driving or the driven element, and for convenience, I will term it the driven element.

10 represents the shaft journaled in the bearings 11, said bearings being slidably mounted upon the base 1, in order to take up the slack, increasing or decreasing the distance between the shafts 2 and 10, to maintain the belt in driving relation with the faces of the pulleys. These bearings are shifted simultaneously by the following instrumentalities:—12 represents a lever fixed to the rock-shaft 13, journaled in brackets 14, projecting from the base 1, and pivotally connected to a link 15, connected to one of the bearings. Upon the opposite end of the rock-shaft 13 an arm, 16, is fixed, likewise provided with a link 15, connected to the opposite bearing 11. 17 represents a slot formed in the bracket projection 18, extended from the base 1 or frame of the machine to which the variable speed mechanism is attached, said slot being in the arc of movement of lever 12 and 19 represents a lock-lever for locking the parts in their adjusted position.

20 represents a step-pulley fixed to shaft 10, having four different diameter belt surfaces, *a, b, c,* and *d,* alined relatively with those of pulley 4.

21 represents a driving pulley fixed upon shaft 10.

22 represents a belt for conveying motion from one step-pulley to another, which belt is shifted to effect a speed change between the driving and driven elements, which shifting is accomplished by the following instrumentalities:—23 represents a shaft suitably journaled in bearings, provided with a hand-wheel 24 for rotating said shaft. 25 represents a bevel-gear fixed to shaft 23, in mesh with a bevel-gear 26, fixed upon shaft 27, journaled in bearings on the base 1. 28 represents an intermittent gear fixed to shaft 27, constructed to alternately engage and rotate the intermittent gears 29, 30, fixed respectively to the shafts 31, 32, the arrangement being such that the rotation of the intermittent gear 28, (see Fig. 5), will cause the gear 29 to rotate one revolution while the intermittent gear 30 remains idle, and vice versa. This is accomplished by making the diameter of gear 28 twice that of gears 29, 30, and providing one half of their periphery with teeth and the remainder plain, the plain surface of gear 28, during the engagement of the teeth with one of the gears 29, 30, will lock the other against rotation. The intermittent gears 29, 30, being each provided with a plain surface 33, with an arc cut on its periphery equal in radius to that of the plain surface 34 of intermittent-gear 28. Thus, as gear 28, say is rotated in the direction shown by the arrow, Fig. 5, the teeth thereof will engage and intermesh with the teeth of intermittent gear 29, rotating the same, one revolution bringing the portion 33 of gear 29 to its normal position, permitting the plain surface 34 of gear 28 to travel in the arc of the segment of gear 29, locking the same against rotation and at which time the teeth have intermeshed with segment gear 30, to rotate it a complete revolution. By this means I am enabled to intermittently revolve one shaft controlling belt shifting means in advance of a second, or in other words, I am enabled to alternately actuate two belt shifting means for shifting a belt from one step of a pair of pulleys to a second step.

35, 36 represent cams keyed to their respective shafts 31, 32, for operating the slidable belt shifters 37, 38, slidably mounted upon the connecting rod 39, fixed to the frame 1. Each belt shifter being provided with a stud 40, carrying a roller engaged into the spiral groove 41 of its cam. The pitch of the cam-groove being proportioned according to the width of the steps of the pulleys, the belt traveling between a loop formed in the belt shifter.

*Mode of operation.*—To produce a change of speed the belt is shifted from one set of relatively opposing steps or surfaces of the pulleys, to a second, say from pulley surfaces 5 and *a* to the surfaces 6 and *b*, by releasing the lock lever 19, and shifting the lever 12 to move the bearings 11, toward the bearings 3, to release the belt when the hand-wheel 24 is rotated say, to the right, which will intermittently through the segment-gears 28, 29, and 30, alternately rotate the spirally grooved wheels or worms 35 and 36, first shifting the belt shifter 37, throwing the belt 22 from the step *a* to *b*, and then shifting the belt shifter 38, to bring the belt 22 from the surface 5, to the surface 6, after which the lever 12 is again actuated to tighten the belt properly and locked in such position.

Having described my invention, I claim:

1. A variable speed device, having a pair of step-pulleys, a belt for transmitting motion from one pulley to the second, a pair of belt-shifters, one adjacent to each pulley, means for independently shifting each belt-shifter, and means for alternately actuating said belt-shifting means to effect a change of speed between one pulley as the driver, and the second as the driven.

2. In a variable speed device a pair of step pulleys and transmitting belt, a pair of belt shifters, means for independently shifting each belt shifter, and means for alternately actuating said belt shifter means.

3. In a variable speed device a pair of step pulleys, and transmitting belt, a pair of belt shifters, means for independently shifting each belt shifter, means for alternately actuating said belt shifter means, and means for adjusting said pulleys relatively to each other for controlling the tension of the belt.

4. In a variable speed device a pair of step pulleys, and transmitting belt, a pair of belt shifters, independent means for shifting each shifter, means for alternately actuating said belt shifter means, locking one during the actuation of the other, and mechanism coöperative with the belt and pulleys for governing the tension of said belt.

5. In a variable speed device a pair of step pulleys, and transmitting belt, a pair of belt shifters, independent means engaging with each of said belt shifters for laterally shifting the same, and means for intermittently operating said belt shifter means to shift the belt upon one pulley in advance of the second.

6. In a variable speed device a pair of step pulleys and transmitting belt, a belt shifter adjacent to each pulley slidable horizontally, rods for supporting each belt shifter, a cam for each shifter engaged thereby, a train of intermittent gearing in driven connection with said cams, for alternately rotating said cams, and a hand-wheel in connection with said train of gearing, whereby by its rotation the belt will be shifted from a step of one pulley in advance of a relative step of the second pulley.

7. In a variable speed device a pair of step pulleys and transmitting belt, a pair of belt shifters, means for intermittently operating said belt shifters from a single source, locking the one against movement during the actuation of the other.

In testimony whereof, I have hereunto set my hand.

HERMAN W. SCHATZ.

Witnesses:
OLIVER B. KAISER,
LUISE BECK.